US012388618B2

(12) United States Patent
Drucker et al.

(10) Patent No.: US 12,388,618 B2
(45) Date of Patent: Aug. 12, 2025

(54) RESHAPING DATA STRUCTURES FOR HOMOMORPHIC COMPUTATIONS USING MULTIPLICATION BY IDENTITY ELEMENTS

(71) Applicant: International Business Machines Corporation, Armonk, NY (US)

(72) Inventors: Nir Drucker, Zichron Yaakov (IL); Ehud Aharoni, Kfar Saba (IL); Gilad Ezov, Nesher (IL); Hayim Shaul, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 18/328,994

(22) Filed: Jun. 5, 2023

(65) Prior Publication Data
US 2024/0405967 A1    Dec. 5, 2024

(51) Int. Cl.
*H04L 29/06*    (2006.01)
*H04L 9/00*    (2022.01)
*H04L 9/06*    (2006.01)

(52) U.S. Cl.
CPC ............ *H04L 9/008* (2013.01); *H04L 9/0618* (2013.01)

(58) Field of Classification Search
None
See application file for complete search history.

(56) References Cited

U.S. PATENT DOCUMENTS

| 2022/0245453 A1 | 8/2022 | Majnemer et al. |
| 2022/0329407 A1 | 10/2022 | Soceanu et al. |
| 2023/0053311 A1 | 2/2023 | Aharoni et al. |

FOREIGN PATENT DOCUMENTS

| EP | 4333356 A1 * | 3/2024 | ............ G06F 8/443 |
| WO | WO-2021162743 A1 * | 8/2021 | ......... G06F 16/2237 |
| WO | 2021201821 A1 | 10/2021 | |

OTHER PUBLICATIONS

Ehud Aharoni, et al., "Complex Encoded Tile Tensors: Accelerating Encrypted Analytics", Published in IEEE Security & Privacy, vol. 20, Issue 5, Jun. 23, 2022, 9 pages.
Aharoni, et al., Helayers: A Tile Tensors Framework For Large Neural Networks On Encrypted Data, arXiv:2011.01805v3 [cs.CR], Jan. 1, 2023, 18 pages.

* cited by examiner

*Primary Examiner* — Andrew J Steinle
(74) *Attorney, Agent, or Firm* — Stosch Sabo (57) ABSTRACT

An example system includes a processor to receive a ciphertext including an encrypted packed plaintext. The processor can, in response to detecting that a reshape is to be executed for a data structure including the packed ciphertext, identify a target shape for the data structure and execute the reshape based on the identified target shape. The reshape is executed using multiplication by an identity element. The processor can then execute a homomorphic computation using the reshaped data structure.

20 Claims, 8 Drawing Sheets

RESHAPING DATA STRUCTURES FOR HOMOMORPHIC COMPUTATIONS USING MULTIPLICATION BY IDENTITY ELEMENTS

BACKGROUND

The present techniques relate to homomorphic encryption. More specifically, the techniques relate to a method for reshaping data structures used for operations performed under homomorphic encryption.

Homomorphic Encryption (HE) schemes may be used to encrypt data while enabling operations to be performed on the encrypted data. In particular, a HE scheme is a cryptosystem that allows its users to evaluate any circuit or function on encrypted data using the following four methods: Gen, Enc, Dec, Eval. For example, a client device can use the Gen method to generate a pair of secret and public keys sk, pk. The client device can store the secret key and publish the public key. Using public key pk, an untrusted party can encrypt sensitive data mi by calling ci=Enc_pk (mi). Subsequently, the client device can prompt an untrusted entity to execute the function c_res=Eval_pk(f,($c_1$, ..., $c_n$)) in order to evaluate a function f on some ciphertexts ci and store the results in another ciphertext c_res. To decrypt c_res using sk, the client calls m_res=Dec_sk (c_res). An HE scheme is correct when m=Dec(Enc(m)) and is approximately correct when m=Dec(Enc(m))+epsilon, for some relatively small epsilon.

HE packing is used to perform HE operations more efficiently. For example, some HE schemes, such as CKKS, operate on ciphertexts in a homomorphic single instruction multiple data (SIMD) fashion. This means that a single ciphertext encrypts a fixed-size vector, and the homomorphic operations on the ciphertext are performed slot-wise on the elements of the plaintext vector. To utilize the SIMD feature, more than one input element is packed and encrypted in every ciphertext. The packing method can dramatically improve the latency (i.e., time to perform computation), throughput (i.e., number of computations performed in a unit of time), communication costs, and memory requirements.

A tile tensor is a data structure that makes packing easier. Tile tensors may be used to pack plaintext before the plaintext encrypted. For example, packing a matrix m1 using tile tensors can be performed using two-dimensional (2D) or three-dimensional (3D) tile tensors, depending on the context. As one example, when the goal is to multiply a matrix m1 by a vector v, 2D objects may be used for m1 and v. As another example, if the goal is to multiply matrix m1 by another matrix m2, then 3D objects may be used. Vector v, matrix m1, and matrix m2 may thus be packed using different representations, also referred to herein as shapes, that depend on the context. For example, vector v may be packed in either the first dimension of the tile tensor and duplicated over its second dimension, or vice versa. In some instances, matrix m1, and matrix m2 may be packed over two of the three dimensions of a 3D tile tensor, and the third dimension then used for broadcasting the matrix. In various examples, a matrix may be packed as-is or in a transposed way. In general, there are thus six different ways to pack a matrix.

In order to perform a vector-matrix or matrix-matrix multiplication, the tile-tensor dimensions need to agree. This is similar to standard vector-matrix or matrix-matrix multiplication, where some cases may require transposing at least one of the objects. However, unlike the standard vector-matrix or matrix-matrix multiplication, performing a transpose or a reshape operation on tile tensors under HE may not be straightforward. For example, a reshape operation may often require moving every element to a different position, which in practice may involve $n^2$ rotations and masking operations for an n-element matrix.

SUMMARY

According to an embodiment described herein, a system can include processor to receive a ciphertext including an encrypted packed plaintext. The processor can also further, in response to detecting that a reshape is to be executed for a data structure containing the packed plaintext, identify a target shape for the data structure and execute the reshape based on the identified target shape, wherein the reshape is executed using multiplication by an identity element. The processor can also execute a homomorphic computation using the reshaped data structure. Thus, the system enables efficient reshaping of the vector and matrices to enable efficient homomorphic operations. Optionally, the processor is to execute the reshape to transpose the data structure. In this embodiment, a transpose of the data structure is efficiently executed. Preferably, the processor is to execute a simulation to determine whether to reshape the data structure using the identity element or a general reshape operation. In this embodiment, the reshape is more efficiently executed. Optionally, the homomorphic computation includes a multiplication of a vector and a matrix. In this embodiment, a vector and matrix can be efficiently multiplied. Optionally, the reshape is done by a multiplication with some element other than the identity element, where the results of the multiplication is a modification of data contained in the data structure. In this embodiment, a reshape and modification of data can be simultaneously and efficiently performed. Preferably, the data structure includes a tile tensor. In this embodiment, the tile tensor enables efficient operations on packed data. Preferably, the ciphertext is encrypted using fully homomorphic encryption. In this embodiment, homomorphic operations are enabled on secure data. Optionally, the identity element includes an identity matrix. In this embodiment, two-dimensional data structures can be efficiently reshaped. Optionally, the reshape includes a number of multiplications by the identity element. In this embodiment, more complex reshaping can be executed efficiently.

According to another embodiment described herein, a method can include receiving, via a processor, a ciphertext including an encrypted packed plaintext. The method can further include, identifying, via the processor, in response to detecting that a reshape is to be executed for a data structure containing the packed plaintext, a target shape for the data structure and executing the reshape based on the identified target shape, wherein executing the includes multiplying the data structure by an identity element. The method can also further include executing, via the processor, a homomorphic computation using the reshaped data structure. Thus, the method enables efficient reshaping of the vector and matrices to enable efficient homomorphic operations. Optionally, the reshape includes a number of multiplications by the identity element. In this embodiment, more complex reshaping can be executed efficiently. Optionally, the reshape further includes a permutation. In this embodiment, permutations can be efficiently executed simultaneously with reshaping. Optionally, the homomorphic computation includes a multiplication of matrices. In this embodiment, matrices with different structures can be efficiently multiplied. Optionally, the homomorphic computation includes a multiplication of a vector and a matrix. In this embodiment, vectors and a matrices can be efficiently multiplied. Preferably, the method further includes executing, via the processor, a simulation to determine whether to reshape the data structure using the identity matrix or a general reshape operation. In this embodiment, the reshape is more efficiently executed.

According to another embodiment described herein, a computer program product for reshaping tile tensors can include computer-readable storage medium having program code embodied therewith. The program code executable by a processor to cause the processor to receive a ciphertext including an encrypted packed plaintext. The program code can also cause the processor to, in response to detecting that a reshape is to be executed for a data structure containing the packed plaintext, identify a target shape for the data structure and execute the reshape based on the identified target shape, wherein the reshape is executed using multiplication by an identity element. The program code can also cause the processor to execute a homomorphic computation using the reshaped data structure. Thus, the computer program product enables efficient reshaping of the vector and matrices to enable efficient homomorphic operations. Optionally, the program code can also cause the processor to execute a number of reshapes on the data structure to reshape the reshaped data structure into the target shape. In this embodiment, more complex reshaping can be executed efficiently. Optionally, the program code can also cause the processor to permute the data structure using the identity element, wherein the identity element is combined with a permutation element. In this embodiment, permutations can be efficiently executed simultaneously with rehaping. Optionally, the program code can also cause the processor to execute a matrix multiplication by an identity matrix to reshape the data structure. In this embodiment, two-dimensional data structures can be efficiently reshaped. Preferably, the program code can also cause the processor to execute a simulation to determine whether to reshape the data structure using the identity matrix or a general reshape operation. In this embodiment, the reshape is more efficiently executed.

DETAILED DESCRIPTION

According to embodiments of the present disclosure, a system includes a processor to receive a ciphertext including an encrypted packed plaintext. The processor can, in response to detecting that a reshape is to be executed for a data structure containing the packed plaintext, identify a target shape for the data structure and execute the reshape based on the identified target shape. The reshape is executed using multiplication by an identity element. As used herein, multiplication can refer to any of a number of different mathematical operations. For example, when considering integers, then multiplication may be multiplication of two integers. In some examples, when considering matrices, multiplication may be the matrix multiplication of two matrices. In general, the multiplication operation is based on the associated mathematical structure being operated on, and is not restricted to the two examples above. For example, more complex multiplication operations may be used for mathematical structures with higher dimensions, such as convolutional operations. The processor can then execute a homomorphic computation using the reshaped data structure. Thus, given a vector v[1xa] and matrices m1[axb], m2[bxc] packed and encrypted in tile tensors, the embodiments enable efficient reshaping of the vector and matrices to enable efficient homomorphic operations such as multiplication without having the secret key, and thus without decrypting the vector or matrices. As one example, the embodiments enable efficient reshaping of matrices to ensure that the shapes of encrypted tile tensors that contain two matrices or a matrix and a vector agree so that the two can be multiplied. In various examples, the embodiments also allow any other generic computations using identity elements in any number of dimensions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
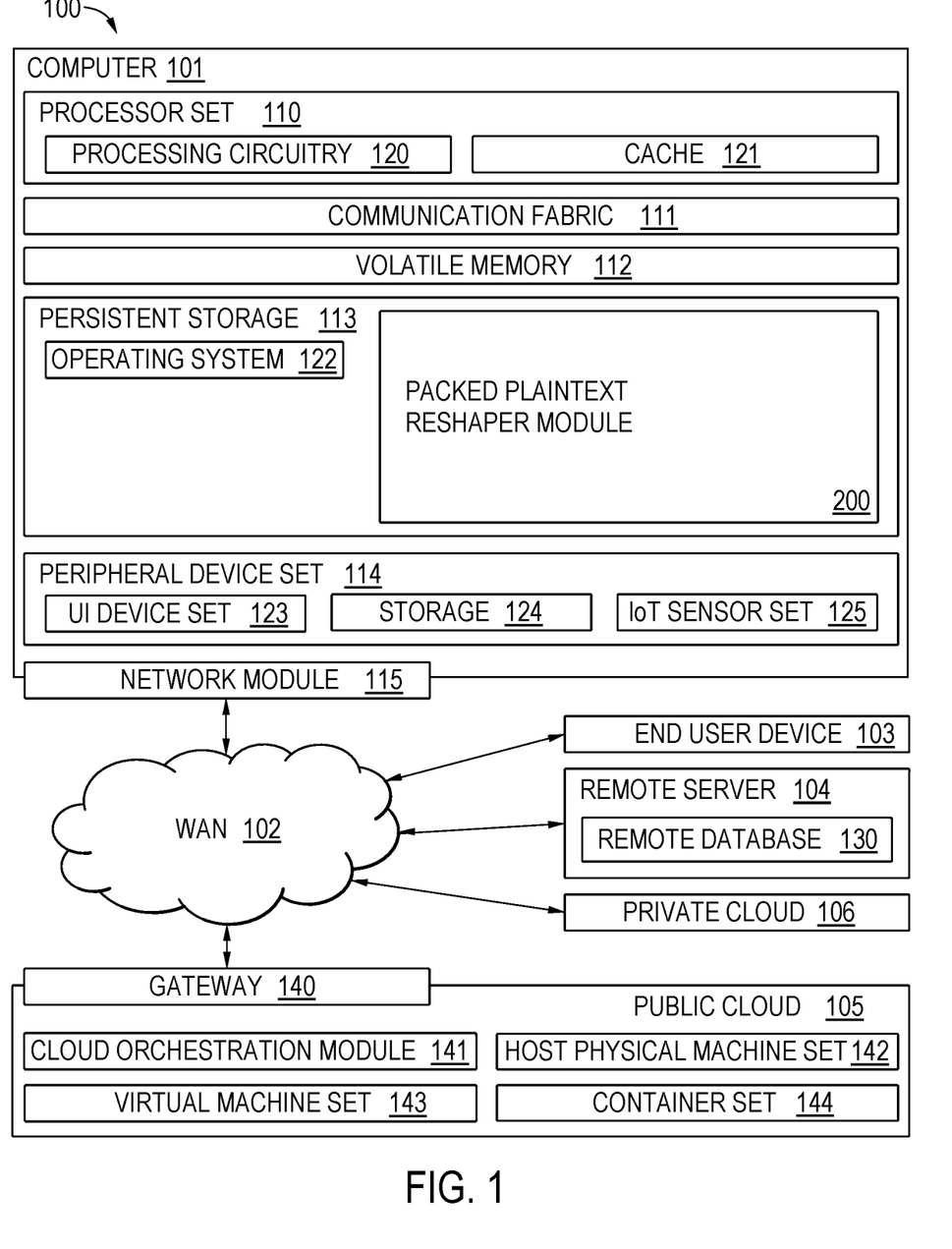
FIG. 1 is a block diagram of an example computing environment that contains an example of an environment for the execution of at least some of the computer code involved in performing the inventive methods, such as a data structure reshaper module.

Computing environment 100 contains an example of an environment for the execution of at least some of the computer code involved in performing the inventive methods, such as a packed plaintext reshaper module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as BLUEBOOTH® connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
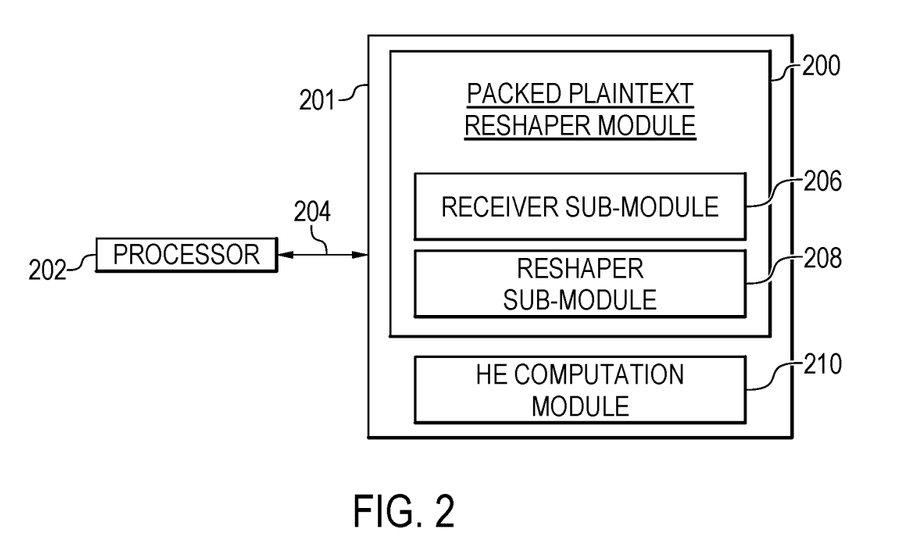
FIG. 2 is an example tangible, non-transitory computer-readable medium that can reshape data structures for execution of homomorphic operations.

Referring now to FIG. 2, a block diagram is depicted of an example tangible, non-transitory computer-readable medium 201 that can reshape ciphertexts for execution of homomorphic operations. The tangible, non-transitory, computer-readable medium 201 may be accessed by a processor 202 over a computer interconnect 204. Furthermore, the tangible, non-transitory, computer-readable medium 201 may include code to direct the processor 202 to perform the operations of the method 300 of FIG. 3.

The various software components discussed herein may be stored on the tangible, non-transitory, computer-readable medium 201, as indicated in FIG. 2. For example, the packed plaintext reshaper module 200 includes a receiver submodule 206 that includes code to receive a ciphertext. For example, the ciphertext may be an encrypted tile tensor. The ciphertext corresponds to plaintext that was packed using the tile tensor and encrypted into the ciphertext an encrypted packed plaintext. In various examples, the ciphertext may be encrypted using fully homomorphic encryption. The packed plaintext reshaper module 200 includes a reshaper submodule 208 that includes code to, in response to detecting that a reshape is to be executed for the data structure, identify a target shape for the ciphertext and execute the reshape based on the identified target shape. In various examples, the reshape can be executed using multiplication by an identity element. The reshaper module 208 further includes code to execute a number of reshapes on the data structure used to pack the plaintext corresponding to the ciphertext, to reshape the data structure into the target shape. In some examples, the reshaper module 208 includes code to execute a simulation to determine whether to reshape the data structure using the identity matrix or a general reshape operation. For example, the general reshape operation may include masking every element by using a dedicated mask of zeros and one in the relevant location. In various examples, the masking operation is done using one multiplication per element. The general reshape operation may also include rotating every masked element to its right location. The general reshape operation may further include combining all the rotated elements together by summing all the rotated elements. In some examples, the reshaper module 208 includes code to execute a matrix multiplication by an identity matrix to reshape the data structure. In various examples, the reshaper module 208 includes code to execute a permutation on the data structure. For example, the reshaper module 208 can include code to permute the data structure using the identity element, where the identity element is combined with a permutation element. A homomorphic encryption (HE) computation module 210 includes code to execute homomorphic computations using the reshaped data structure. The module 210 also includes code to execute homomorphic computations on original ciphertexts.

It is to be understood that any number of additional software components not shown in FIG. 2 may be included within the tangible, non-transitory, computer-readable medium 201, depending on the specific application. For example, the computer-readable medium 201 may also include any number of additional components that can process the results of the homomorphic computations.

Figure 3:
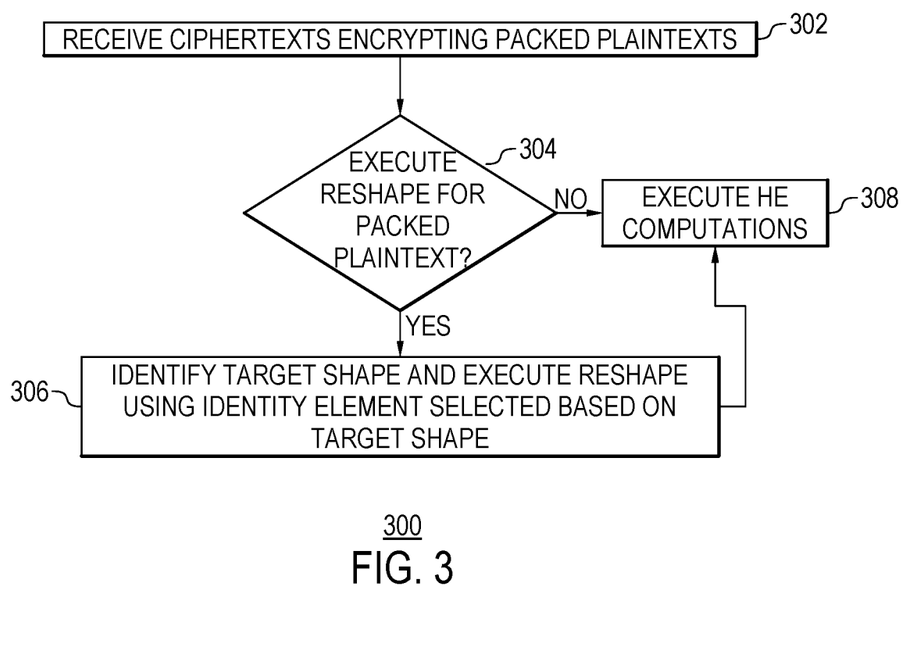
FIG. 3 is a process flow diagram of an example method that can reshape data structures for execution of homomorphic operations.

FIG. 3 is a process flow diagram of an example method that can reshape ciphertexts for execution of homomorphic operations. The method 300 can be implemented with any suitable computing device, such as the computer 101 of FIG. 1. For example, the methods described below can be implemented by the processor set 110 of FIG. 1.

At block 302, a set of ciphertexts are received. The ciphertexts may include packed and encrypted plaintext. For example, the ciphertexts may be homomorphically encrypted (HE). In various examples, metadata describing the shape of the packed and encrypted ciphertexts is also received. For example, the metadata may be a shape of one or more tile tensors.

At decision diamond 304, for each ciphertext, a determination is made as to whether a reshape is to be executed for a data structure containing the packed plaintext. For example, simulation may be executed to determine whether to reshape the data structure using the identity matrix or a general reshape operation. If so, then the method may proceed at block 306. If not, then the method may proceed at block 308.

At block 306, in response to detecting that a reshape is to be executed, a target shape is identified and the reshape is executed using an identity element selected based on the target shape. For example, the identity element may be an identity matrix. In various examples, the reshape may be executed to transpose the data structure. In some examples, the reshape may involve one or more multiplications of the ciphertext to be reshaped by the identity element. In some examples, the reshape may be a matrix multiplication by an identity matrix. In some examples, a simulation may be executed to determine whether to reshape the data structure using the identity matrix or a general reshape operation. For example, the general reshape operation may include masking every element by using a dedicated mask of zeros and one in the relevant location. In various examples, the masking operation is done using one multiplication per element. The general reshape operation may also include rotating every masked element to its right location. The general reshape operation may further include combining all the rotated elements together by summing all the rotated elements. In various examples, other types of mathematical objects may be stitched with the identity element during the reshape to save operations. For example, instead of multiplying by the identity matrix that only performs a reshape, a permutation matrix including an identity matrix where the columns or rows are permuted may alternatively be used to reshape the data structure while permuting its elements. As one example, consider multiplying a tile tensor with the value 0.1234, which costs one multiplication. If it is known that a reshape is also needed, then the matrix I[nxn] can be replaced with the matrix 0.1234I[nxn], to save the extra multiplication. In various examples, the reshape is done by a multiplication with some element other than the identity element, where the results of the multiplication is a modification of data contained in the data structure. In some examples, the reshape may thus include a permutation. For example, the packed plaintext may be additionally or alternatively multiplied by a permutation element, such as a permutation matrix that permutes a row or column of the matrix.

At block 308, a homomorphic encryption (HE) operation is executed. For example, the HE operation may be executed on the reshaped ciphertexts. For example, the HE operation may be a multiplication of matrices. In some examples, the HE operation may be a multiplication of a vector and a matrix. In various examples, the HE operation may be executed on original ciphertexts if the determination at decision diamond 304 was that these ciphertexts did not need to be reshaped.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 may include another determination as to whether a general reshape may be used for another packed ciphertext instead of the identity element based reshaping. For example, such an additional determination may be made in response to detecting that a reshape is to be executed at decision diamond 304.

Figure 4:
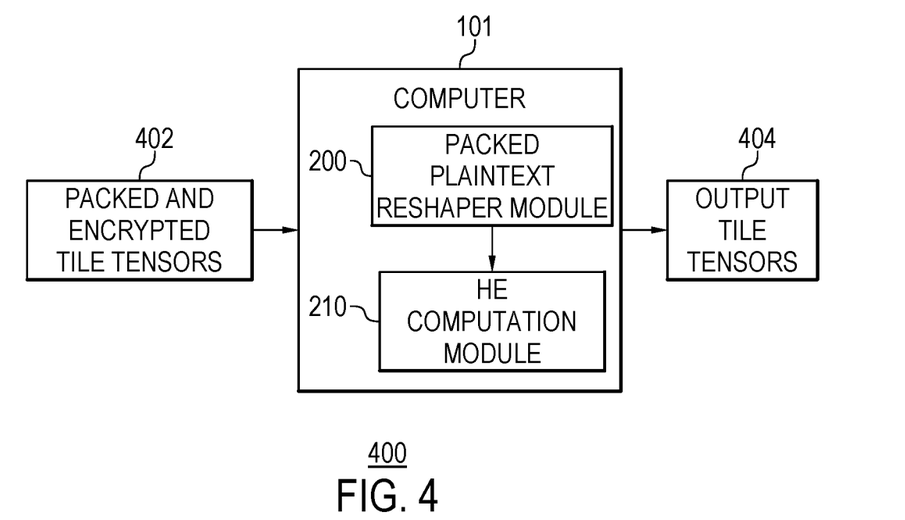
FIG. 4 is a block diagram of an example system for reshaping data structures for execution of homomorphic operations.

With reference now to FIG. 4, a block diagram shows an example system for reshaping ciphertexts for execution of homomorphic operations. The example system 400 of FIG. 4 includes similarly referenced elements from FIGS. 1 and 2. For example, the system 400 includes computer 101 including a packed plaintext reshaper module 200 and HE computation module 210. The computer 101 of system 400 is shown receiving packed and encrypted tile tensors 402 and generating output tile tensors 404. For example, the packed and encrypted tile tensors 402 may be received from a client device (not shown). In some examples, the packed ciphertext is encrypted using fully homomorphic encryption.

In the example of FIG. 4, the packed plaintext reshaper module 200 can receive a packed ciphertext. For example, the packed ciphertext may be in the form of a tile tensor 402. The packed plaintext reshaper module 200 can in response to detecting that a reshape is to be executed for the packed ciphertext, identify a target shape for the packed ciphertext and execute the reshape based on the identified target shape. The reshape is executed using multiplication by an identity element, such as an identity matrix. In various examples, the reshape is executed to transpose a tile tensor that packs a matrix or a vector. In some examples, the packed plaintext reshaper module 200 can execute a simulation to determine whether to reshape the packed ciphertext using the identity matrix or a general reshape operation. For example, the general reshape operation may include masking every element by using a dedicated mask of zeros and one in the relevant location. In various examples, the masking operation is done using one multiplication per element. The general reshape operation may also include rotating every masked element to its right location. The general reshape operation may further include combining all the rotated elements together by summing all the rotated elements. In some examples, the reshape may include a number of multiplications by the identity element. The HE computation module 210 can then execute a homomorphic computation using the reshaped packed ciphertext. For example, the homomorphic computation may be a multiplication of a vector and a matrix. In some examples, the homomorphic computation may be a matrix multiplication. The computer 101 can thus generate output tile tensors 404 from the homomorphic computation.

As one specific example, the packed and encrypted tile tensors 402 include four matrices m1[4,5], m2[5,6], m3[6, 7], and m4[7,8] that are to be multiplied together, where matrix m1 has four rows and five columns, matrix m2 has five rows and six columns, etc. As used herein, lower-case letters represent matrices and upper-case letters represent 3D tile tensors that pack the matrices. To have all the dimensions agree, matrices m1-m4 may be packed as follows in tiles of 16,384 slots:
M1 shape=[5/16, 4/16, */64]
M2 shape=[5/16, */16, 6/64]
M3 shape=[7/16, */16, 6/64]
M4 shape=[7/16, */16, 8/64]

where * indicates a duplicated value. For example, in M1, the matrix m1 that is packed in the first and second dimensions, is duplicated 64 times over the third dimension. For example, the matrix may be duplicated using a method known as broadcasting. In M2, the m2 matrix that is packed in the first and third dimensions is duplicated 16 times over the second dimension. Example duplications are shown and discussed in greater detail with respect to FIGS. 5 and 6. The reason for such packing is demonstrated in the complete multiplication sequence:
M1*M2 shape=[*/16, 4/16, 6/64]
—M3 shape=[7/16, */16 , 6/64]
M1*M2*M3 shape=[7/16, 4/16, 1?/64]
M1*M2*M3 shape (After clearing unknowns)=[7/16, 4/16, 1/64]
M1*M2*M3 shape (After duplicating)=[7/16, 4/16, */64]
—M4 shape=[7/16, */16, 8/64]
M1*M2*M3*M4 shape=[*/16, 4/16, 8/64]

In particular, for every multiplication, two operands agree on one dimension and are broadcast on different dimensions. Thus, if the tile tensor M3 instead had the shape M3 shape=[*/16, 7/16, 6/64], then the multiplier may not able to use it as its shape does not agree with the shape of M1*M2. One way to solve this problem is to run a general reshape operation from [*/16, 7/16, 6/64] to [7/16, */16, 6/64]. However, this problem can alternatively be solved by packing the identity matrix I[7×7] in a tile tensor where the I shape is [7/16, 7/16, */64]. Consequently, M3*I shape=[7/16, */16, 6/64] as required. When using tile tensors: using matrix multiplication computationally costs: one tile tensor multiplication, an inner-sum operation, and might include a cleanup operation depending on the tile tensor final shape. By contrast, a general reshape operation thus involve many rotations and multiplications by masks, but has a depth of 1.

In some examples, using tile tensors multiplication instead of reshaping can achieve better performance. In some examples, it may not always possible to move from a source shape to a target shape by using only one multiplication. As one example, two groups of shapes are shown below, where r and c stand for the "rows" and "columns" of the packed matrix:
(1) [r,c,*] [*,r,c] [c,*,r]
(2) [r,*,c] [c,r,*] [*,c,r]

It is possible to move from (1) to (2) with one multiplication and between shapes in the same group by using two multiplications. In various examples, the cost can be a 1, 2, or 4 multiplication depth depending on the source and target shape. In various examples, a decision as to whether to use a general reshape or an identity-based reshape may be performed using analytic computations, such as which method uses a lower number of total multiplications. In some examples, a program designer can run a simulator such as the HELayers simulator to determine what operation is faster, or analytically compare the two approaches when the shapes are known. In various examples, an optimizer can be modified to automatically predict and use the better approach. For example, the optimizer may be a homomorphic encryption optimizer that can be modified to automatically execute simulations and analytics. For example, the optimizer can run a simulation on both a general reshape and a reshape using one or more identity elements and determine which method is faster or more efficient. In some examples, the optimizer can count the number of multiplications or rotations and determine the fastest method based on a system characteristic.

It is to be understood that the block diagram of FIG. 4 is not intended to indicate that the system 400 is to include all of the components shown in FIG. 4. Rather, the system 400 can include fewer or additional components not illustrated in FIG. 4 (e.g., additional computers, or additional input tile tensors or output tile tensors, etc.).

Figure 5A:
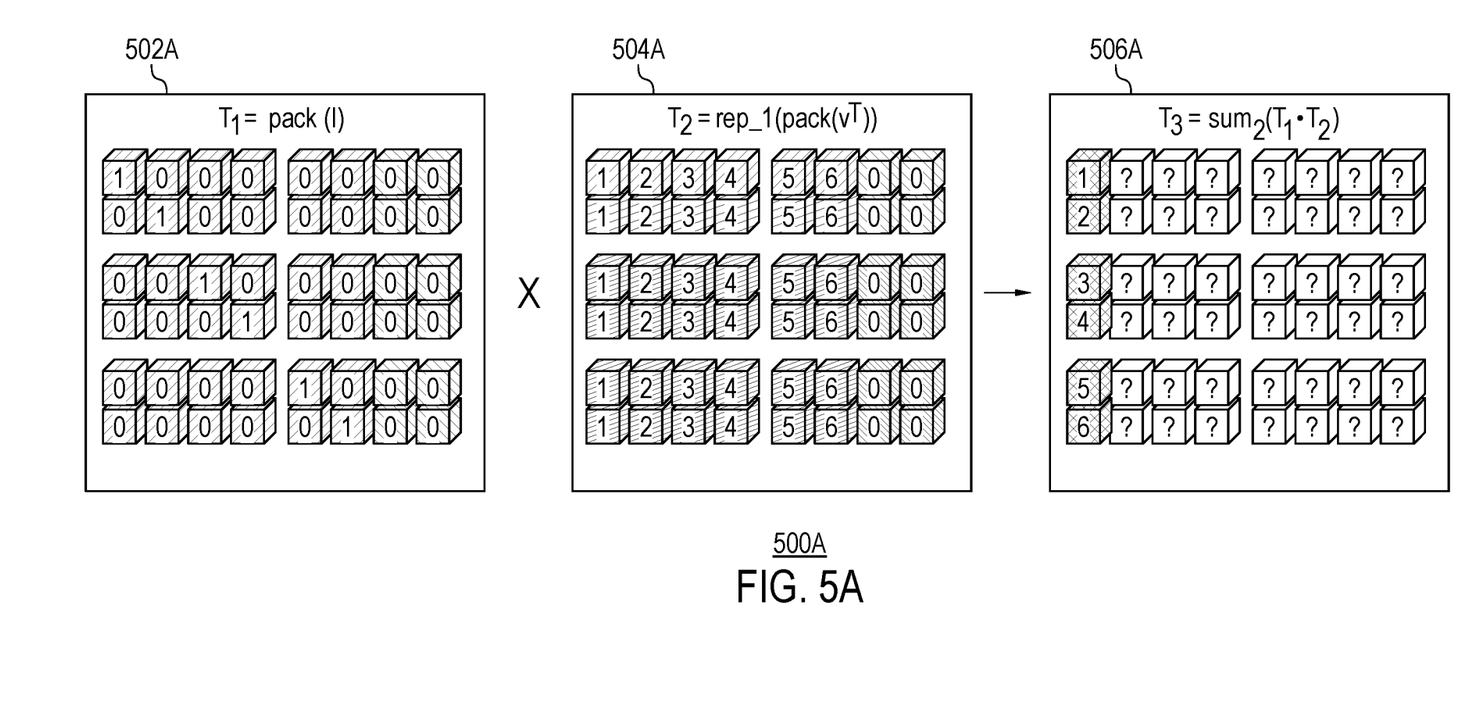
FIG. 5A is an example reshaping operation using an identity matrix, according to embodiments herein.

FIG. 5A is an example reshaping operation using an identity matrix, according to embodiments herein. The reshaping operation 500A can be performed using the method 300 of FIG. 3 via a processor, such as the processor set 110 of FIG. 1.

At block 502A, a two-dimensional tile tensor T1 packing an identity matrix I is received. For example, the tile tensor T1 has dimensions of 3×2 tiles. The identity matrix packed by the tile tensor T1 has dimensions of 6×6. The remaining values to the right of the identity matrix I in the tile tensor T1 are filled with zeros.

At block 504A, a second tile tensor T2 includes a duplicated transpose of the vector v. The vector v includes values [1,2,3,4,5,6]. The transposed vector $v^T$ is duplicated vertically down the rows.

At block 506A, a tile tensor T3 shows the product of the multiplication of tensor T1 and tensor T2. In particular, the tile tensor T3 includes values 1, 2, 3, 4, 5, and 6 in the first column. However, in tile tensor T3, the vector is placed on a different dimension than it was originally in tile tensor T2. In particular, the vector is now in a column versus in a row. Thus, a reshape of the tile tensor was performed without reshaping the underlying vector data.

Figure 5B:
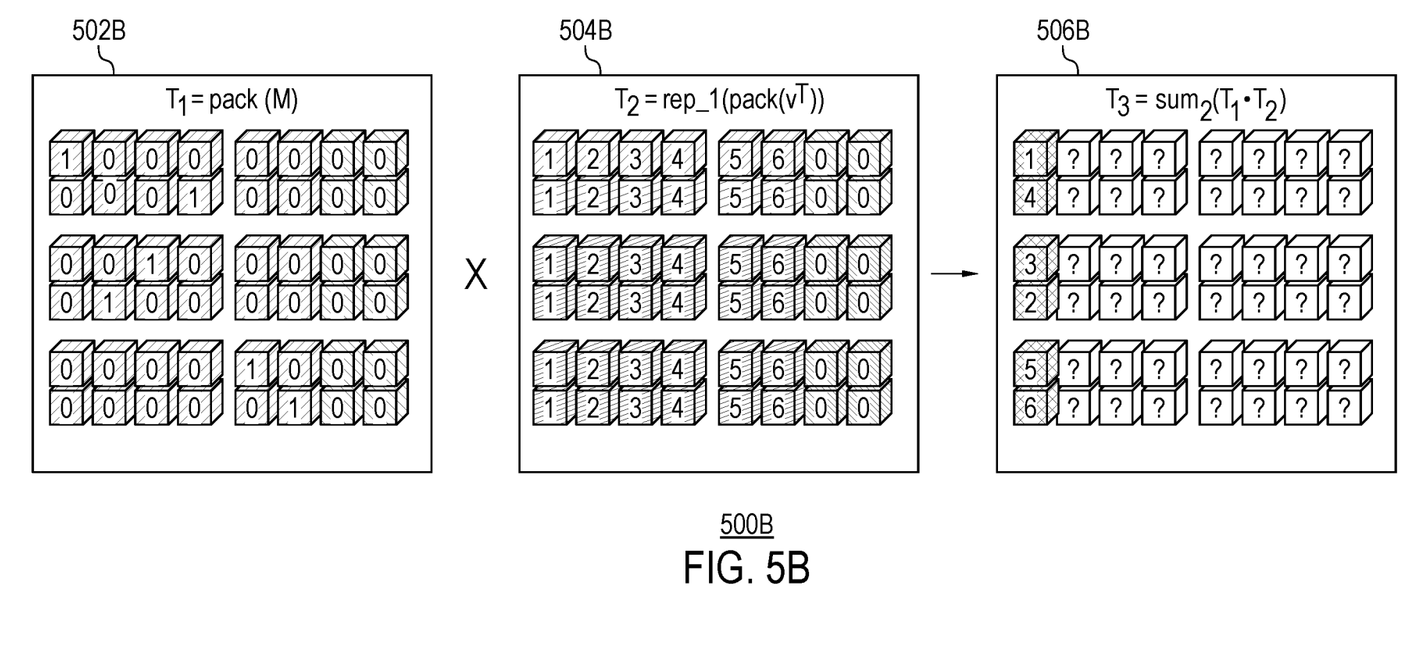
FIG. 5B is an example reshaping operation using a permutation matrix, according to embodiments herein.

FIG. 5B is an example reshaping operation using a permutation matrix, according to embodiments herein. The reshaping operation 500B can be performed using the method 300 of FIG. 3 via a processor, such as the processor set 110 of FIG. 1.

At block 502B, a two-dimensional tile tensor T1 packing a permutation matrix M is received. For example, the tile tensor T1 has dimensions of 3×2 tiles. The permutation matrix M packed by the tile tensor T1 has dimensions of 6×6 blocks. The remaining values to the right of the permutation matrix M in tile tensor T1 are filled with zeros.

At block 504B, a second tile tensor T2 includes a duplicated transpose of the vector v. The vector v includes values [1,2,3,4,5,6]. The transposed vector $v^T$ is duplicated vertically down the rows.

At block 506B, a tile tensor T3 shows the product of the multiplication of tensor T1 and tensor T2. In particular, the tensor T3 includes values 1, 4, 3, 2, 5, and 6 in the first column. As compared with the elements of original vector v, the second and fourth elements in the column of tile tensor T3 are swapped. The tile sensor T3 is thus a reshape of the tile tensor T2.

Figure 5C:
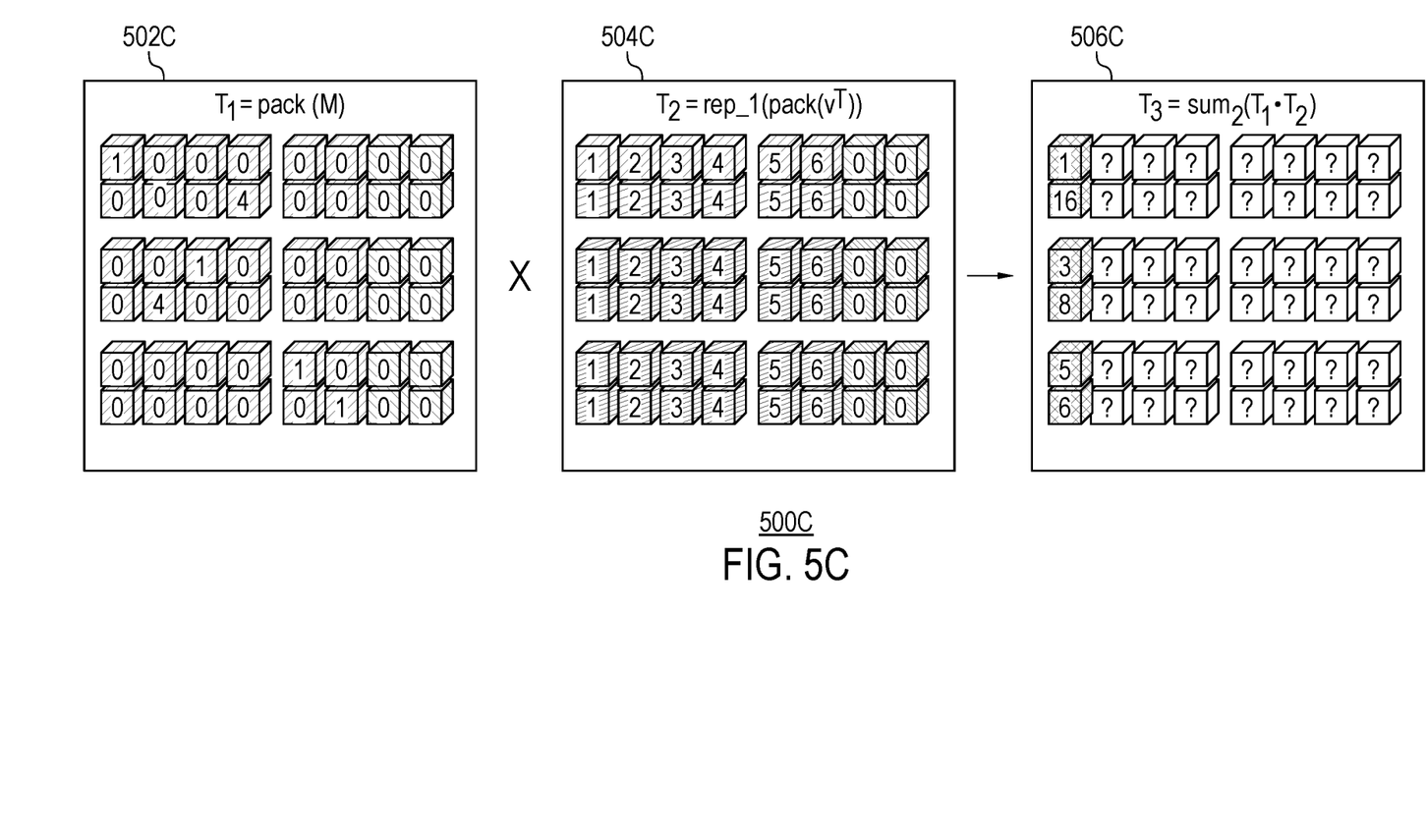
FIG. 5C is an example reshaping operation using a permutation and size extension matrix, according to embodiments herein.

FIG. 5C is an example reshaping operation using a permutation and size extension matrix, according to embodiments herein. The reshaping operation 500C can be performed using the method 300 of FIG. 3 via a processor, such as the processor set 110 of FIG. 1.

At block 502C, a two-dimensional tile tensor T1 packing a permutation and size extension matrix M is received. For example, the tile tensor T1 has dimensions of 3×2 tiles. The permutation matrix M packed by the tile tensor T1 has dimensions of 6×6 blocks. The remaining values to the right of the permutation matrix M in tile tensor T1 are filled with zeros.

At block 504C, a second tile tensor T2 includes a duplicated transpose of the vector v. The vector v includes values [1,2,3,4,5,6]. The transposed vector $v^T$ is duplicated vertically down the rows.

At block 506C, a tile tensor T3 shows the product of the multiplication of tensor T1 and tensor T2. In particular, the tensor T3 includes values 1, 16, 3, 8, 5, and 6 in the first column. Thus, the second and fourth elements of vector v have been swapped and have also been increased by a factor of four. Thus, in the example of FIG. 5C tile tensor T3 is a reshape of tile tensor T2. Moreover, in FIG. 5C, two goals are simultaneously performed using one multiplication operation: a matrix-vector multiplication of the underlying plaintexts as well as the reshaping the tile tensor to the required dimension.

Figure 6:
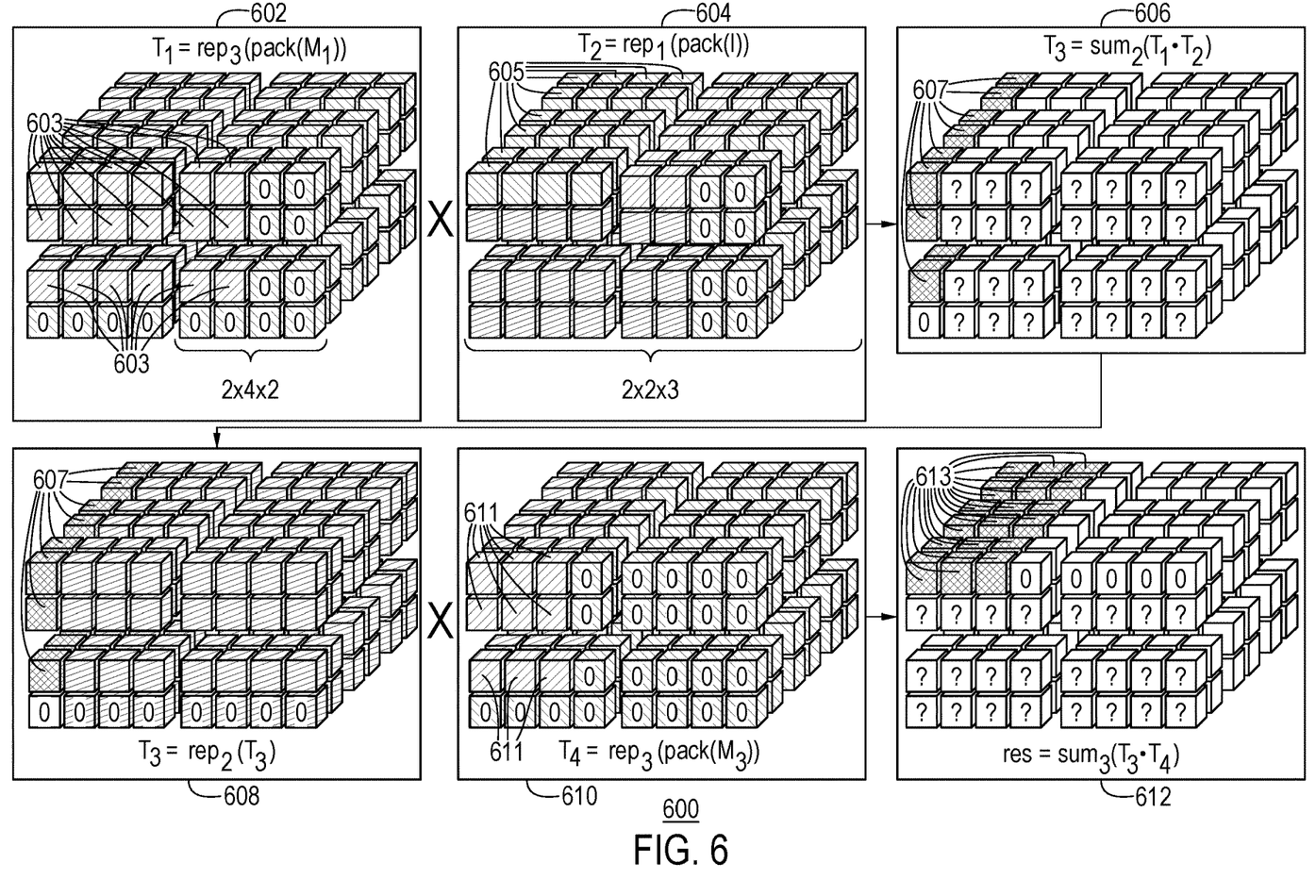
FIG. 6 is an example set of reshaping operations according to embodiments herein.

FIG. 6 is an example set of reshaping operations according to embodiments herein. The reshaping operations 600 of FIG. 6 includes two multiplication operations. The reshaping operation 600 can similarly be performed using the method 300 of FIG. 3 via a processor, such as the processor set 110 of FIG. 1.

At block 602, a tile tensor T1 is received that includes tiles of shape 2×4×2 with an overall external tile tensor shape of 2×2×3 tiles. The tile tensor includes values 603 in the set of four closest tiles that are duplicated in the values of the depth direction of the four closest tiles as well as in the remaining sets of tiles.

At block 604, a tile tensor T2 includes a set of 6×6 values that represent the identity matrix I 605 that are duplicated in the y direction, with a set of zero values for blocks in the rightmost 2×4×6 blocks.

At block 606, a resulting tile tensor T3 includes values 607 that are the results of the multiplication of tile tensors T1 and T2. A set of zero valued blocks are located in the bottom-left most blocks. A set of question marks indicate values that are unknown while encrypted.

At block 608, the tile tensor T3 is modified to duplicate the values 607 in the horizontal direction. The zero valued blocks are similarly duplicated horizontally.

At block 610, the tile tensor T3 is multiplied by a tile tensor T4 that includes a 3×3 matrix M3 corresponding to blocks 611 duplicated in the depth direction. The remaining blocks of tile tensor T4 are filled with zero values.

At block 612, the resulting tile tensor includes values 613 that are the product of the multiplication of tile tensors T3 and T4.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a hardware processor configured to:
    receive a ciphertext comprising an encrypted packed plaintext;
    in response to detecting that a reshape is to be executed for a data structure containing the packed plaintext, identify a target shape for the data structure and execute the reshape based on the identified target shape, wherein the reshape is executed using multiplication by an identity element; and
    execute a homomorphic computation using the reshaped data structure.

2. The system of claim 1, wherein the hardware processor is configured to execute the reshape to transpose the data structure.

3. The system of claim 1, wherein the hardware processor is configured to execute a simulation to determine whether to reshape the data structure using the identity element or a general reshape operation.

4. The system of claim 1, wherein the homomorphic computation comprises a multiplication of a vector and a matrix.

5. The system of claim 1, wherein the reshape is done by a multiplication with some element other than the identity element, wherein the multiplication results in a modification of data contained in the data structure.

6. The system of claim 1, wherein the data structure comprises a tile tensor.

7. The system of claim 1, wherein the ciphertext is encrypted using fully homomorphic encryption.

8. The system of claim 1, wherein the identity element comprises an identity matrix.

9. The system of claim 1, wherein the reshape comprises a plurality of multiplications by the identity element.

10. A computer-implemented method, comprising:
   receiving, via a processor, a ciphertext comprising an encrypted packed plaintext;
   identifying, via the processor, in response to detecting that a reshape is to be executed for a data structure containing the packed plaintext, a target shape for the data structure and executing the reshape based on the identified target shape, wherein the executing comprises multiplying the data structure by an identity element; and
   executing, via the processor, a homomorphic computation using the reshaped data structure.

11. The computer-implemented method of claim 10, wherein the reshape comprises a plurality of multiplications by the identity element.

12. The computer-implemented method of claim 10, wherein the reshape further comprises a permutation.

13. The computer-implemented method of claim 10, wherein the homomorphic computation comprises a multiplication of matrices.

14. The computer-implemented method of claim 10, wherein the homomorphic computation comprises a multiplication of a vector and a matrix.

15. The computer-implemented method of claim 10, comprising executing, via the processor, a simulation to determine whether to reshape the data structure using an identity matrix or a general reshape operation.

16. A computer program product for homomorphic computation, the computer program product comprising a computer-readable storage medium having program code embodied therewith, the program code executable by a processor to cause the processor to:
   receive a ciphertext comprising an encrypted packed plaintext;
   in response to detecting that a reshape is to be executed for a data structure containing the packed plaintext, identify a target shape for the data structure and execute the reshape based on the identified target shape, wherein the reshape is executed using multiplication by an identity element; and
   execute a homomorphic computation using the reshaped data structure.

17. The computer program product of claim 16, further comprising program code executable by the processor to execute a plurality of reshapes on the data structure to reshape the reshaped data structure into the target shape.

18. The computer program product of claim 16, further comprising program code executable by the processor to permute the data structure using the identity element, wherein the identity element is combined with a permutation element.

19. The computer program product of claim 16, further comprising program code executable by the processor to execute a matrix multiplication by an identity matrix to reshape the data structure.

20. The computer program product of claim 16, further comprising program code executable by the processor to execute a simulation to determine whether to reshape the data structure using an identity matrix or a general reshape operation.

* * * * *